(12) United States Patent
Park et al.

(10) Patent No.: US 8,619,394 B1
(45) Date of Patent: Dec. 31, 2013

(54) MAGNETIC TUNNEL JUNCTION WITH BARRIER COOLING FOR MAGNETIC READ HEAD

(71) Applicant: HGST Netherlands B.V., Amsterdam (NL)

(72) Inventors: Chando Park, Palo Alto, CA (US); Sangmun Oh, San Jose, CA (US); Zheng Gao, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/689,573

(22) Filed: Nov. 29, 2012

(51) Int. Cl.
*G11B 5/33* (2006.01)

(52) U.S. Cl.
USPC .................... 360/324.12; 29/603.07

(58) Field of Classification Search
USPC ............... 360/317, 324.12, 324.2; 29/603.07
See application file for complete search history.

(56) References Cited

U.S. PATENT DOCUMENTS

| | | | |
|---|---|---|---|
| 6,482,657 B2 | 11/2002 | Shimazawa | |
| 6,535,365 B1 * | 3/2003 | Lukaszew et al. | 360/324.2 |
| 7,270,896 B2 | 9/2007 | Parkin | |
| 7,488,609 B1 | 2/2009 | Lin et al. | |
| 7,596,015 B2 | 9/2009 | Kitagawa et al. | |
| 8,008,097 B2 * | 8/2011 | Parkin | 438/3 |
| 8,294,228 B2 * | 10/2012 | Peng et al. | 257/421 |
| 8,411,395 B2 * | 4/2013 | Kawakami et al. | 360/324 |
| 2004/0070890 A1 * | 4/2004 | Fullerton et al. | 360/324.2 |
| 2004/0101702 A1 | 5/2004 | Kim et al. | |
| 2007/0154630 A1 | 7/2007 | Kim et al. | |
| 2012/0002463 A1 | 1/2012 | Ranjan et al. | |
| 2012/0018823 A1 | 1/2012 | Huai et al. | |
| 2012/0127603 A1 | 5/2012 | Gao et al. | |
| 2012/0288963 A1 * | 11/2012 | Nishimura | 438/3 |

OTHER PUBLICATIONS

Mathon, et al., Theory of Tunneling Magnetoresistance of an Epitaxial Fe/MgO/Fe(001) junction, Physical Review B vol. 63 220403(R) 2001.

Moodera, et al., Large Magnetoresistance at Room Temperature in Ferromagnetic Thin Film Tunnel Junctions, Physical Review Letters vol. 74 No. 16 Apr. 17, 1995.

* cited by examiner

*Primary Examiner* — Angel Castro
(74) *Attorney, Agent, or Firm* — Patterson & Sheridan, LLP (57) ABSTRACT

The present invention generally relates to a magnetic head having a thinner intermixing layer between a barrier layer and a magnetic layer. The method of making the magnetic head is also disclosed. The thinner intermixing layer in the magnetic head is formed by cooling the barrier layer in an atmosphere having a temperature of below 0 degrees Celsius prior to depositing the magnetic layer on the barrier layer. The thinner intermixing layer leads to a sharp interface between the barrier layer and the magnetic layer, which leads to an increased MR.

19 Claims, 5 Drawing Sheets

MAGNETIC TUNNEL JUNCTION WITH BARRIER COOLING FOR MAGNETIC READ HEAD

BACKGROUND OF THE INVENTION

1. Field of the Invention

Embodiments of the present invention generally relate to a magnetic read head for use in a hard disk drive.

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

As the areal storage density in hard disk drives (HDDs) increases, the demand for a larger magnetoresistive effect has led to extensive research efforts worldwide. Particularly, a barrier layer-based magnetic tunnel junction (MTJ) is currently being used in HDDs. In typical MTJs, band matching between the barrier layer and the adjacent magnetic layers is the most important factor to obtain high magnetoresistance (MR), which is closely related to the epitaxial relationship between the barrier layer and the adjacent layers. Generally, these adjacent layers are amorphous magnetic layers. As the amorphous magnetic layers are deposited on the barrier layer, an intermixing layer is formed due to the less rigid structure of the barrier layer.

In general, the barrier layer has a textured crystalline structure. In order to obtain high MR ratio in this type of MTJ, an annealing step is necessary to alter the amorphous magnetic layers so they have the same textured crystalline structure as the barrier layer. During fabrication, the crystalline barrier layer and the amorphous magnetic layers tend to intermix, which results in poor device performance.

Therefore, there is a need in the art for less intermixing at the interface between the crystalline barrier layer and the amorphous magnetic layers.

SUMMARY OF THE INVENTION

The present invention generally relates to a magnetic head having a thinner intermixing layer between a barrier layer and a magnetic layer. The method of making the magnetic head is also disclosed. The thinner intermixing layer in the magnetic head is formed by cooling the barrier layer in an atmosphere having a temperature of below 0 degrees Celsius prior to depositing the magnetic layer on the barrier layer. The thinner intermixing layer leads to a sharp interface between the barrier layer and the magnetic layer, which leads to an increased MR.

In one embodiment, a method for forming a magnetic head comprises depositing a barrier layer, cooling the barrier layer in an atmosphere having a temperature of below 0 degrees Celsius, forming a free layer and annealing the magnetic head.

In another embodiment, a method for forming a magnetic head comprises depositing a barrier layer on a substrate in a first chamber, moving the substrate having the barrier layer thereon into a second chamber having a stage that is maintained at a temperature of below 0 degrees Celsius, cooling the substrate in the second chamber for a predetermined period of time, depositing a free layer on the barrier layer and annealing the magnetic head.

In another embodiment, a magnetic head comprises a barrier layer, an intermixing layer having a thickness that is 1-3 Angstroms less than a thickness that would otherwise occur in the absence of cooling the barrier layer, and a free layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention generally relates to a magnetic head having a thinner intermixing layer between a barrier layer and a magnetic layer. The method of making the magnetic head is also disclosed. The thinner intermixing layer in the magnetic head is formed by cooling the barrier layer in an atmosphere having a temperature of below 0 degrees Celsius prior to depositing the magnetic layer on the barrier layer. The thinner intermixing layer leads to a sharp interface between the barrier layer and the magnetic layer, which leads to an increased MR.

Figure 1:
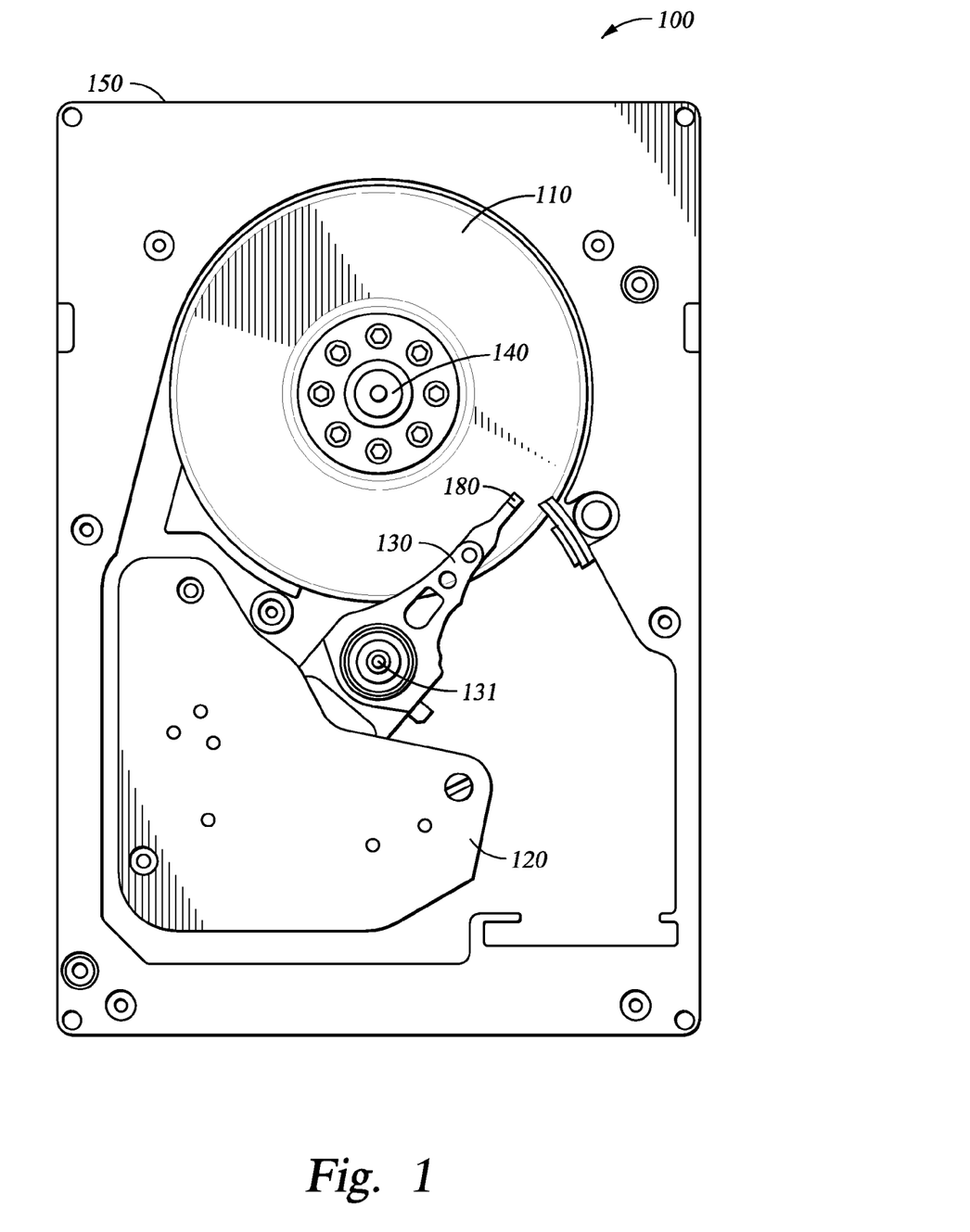
FIG. 1 illustrates an exemplary magnetic disk drive, according to an embodiment of the invention.

FIG. 1 illustrates a top view of an exemplary HDD 100, according to an embodiment of the invention. As illustrated, HDD 100 may include one or more magnetic disks 110, actuator 120, actuator arms 130 associated with each of the magnetic disks, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track.

Figure 2A:
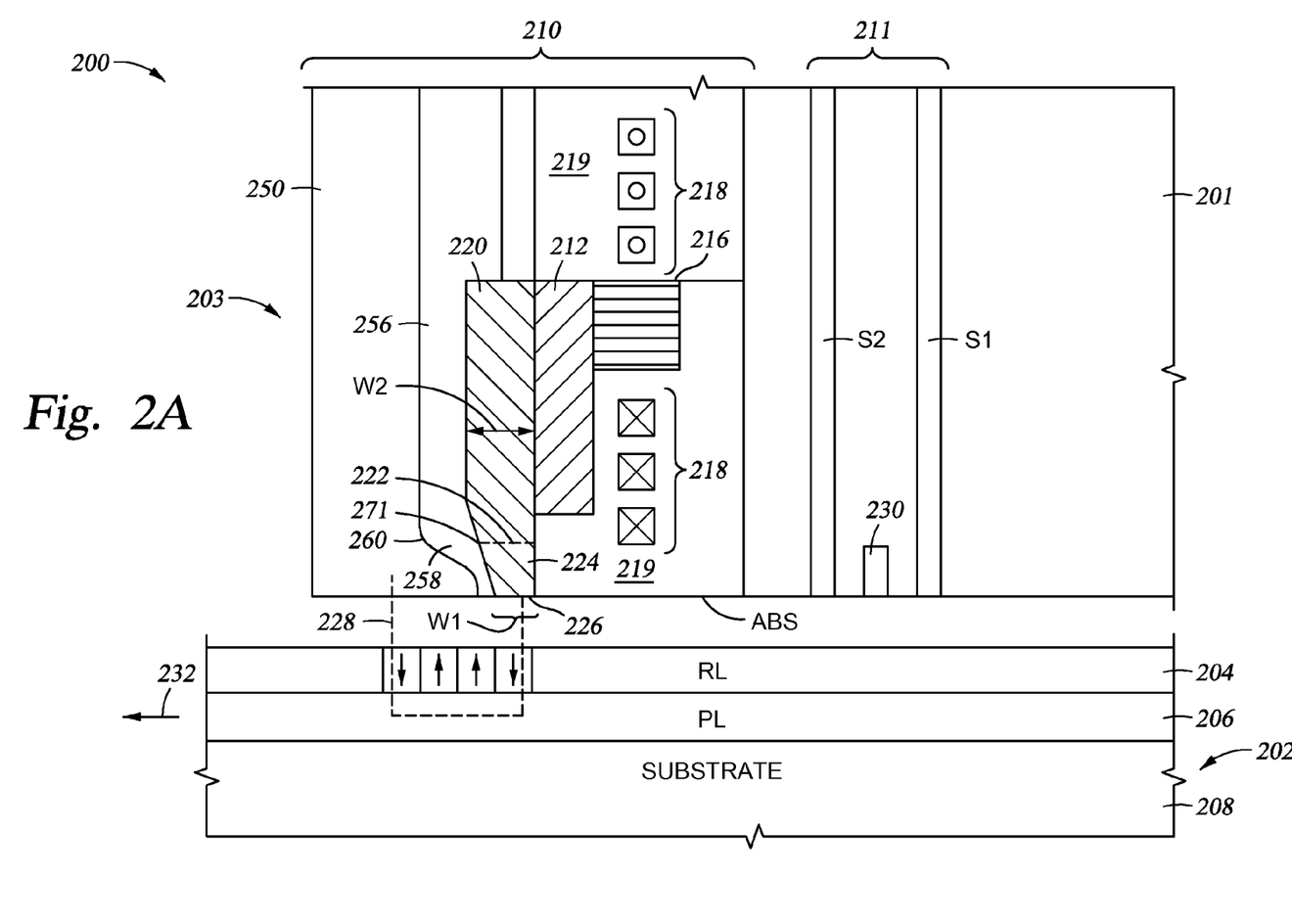
FIG. 2A is a side view of a read/write head and magnetic disk of the disk drive of FIG. 1, according to one embodiment of the invention.

FIG. 2A is a fragmented, cross-sectional side view through the center of a read/write head 200 mounted on a slider 201 and facing magnetic disk 202. The read/write head 200 and magnetic disk 202 may correspond to the magnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206 formed on a disk substrate 208. The read/write head 200 includes an ABS, a magnetic write head 210 and a magnetic read head 211, and is mounted such that its ABS is facing the magnetic disk 202. In FIG. 2A, the disk 202 moves past the write head 210 in the direction indicated by the arrow 232, so the portion of slider 201 that supports the read/write head 200 is often called the slider "trailing" end 203.

In some embodiments, the magnetic read head 211 is a MR read head that includes an MR sensing element 230 located between MR shields S1 and S2. In other embodiments, the magnetic read head 211 is a MTJ read head that includes a MTJ sensing device 230 located between MR shields S1 and S2. The RL 204 is illustrated with perpendicularly recorded or magnetized regions, with adjacent regions having magnetization directions, as represented by the arrows located in the RL 204. The magnetic fields of the adjacent magnetized regions are detectable by the MR (or MTJ) sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. In an alternative embodiment, the yoke 216 may be omitted, and the coil 218 may wrap around the main pole 212. A write pole 220 is magnetically connected to the main pole 212 and has an end 226 that defines part of the ABS of the magnetic write head 210 facing the outer surface of disk 202.

Write pole 220 is a flared write pole and includes a flare point 222 and a pole tip 224 that includes an end 226 that defines part of the ABS. The flare may extend the entire height of write pole 220 (i.e., from the end 226 of the write pole 220 to the top of the write pole 220), or may only extend from the flare point 222, as shown in FIG. 2A. In one embodiment the distance between the flare point 222 and the ABS is between about 30 nm and about 150 nm.

The write pole 220 includes a tapered surface 271 which increases a width of the write pole 220 from a first width W1 at the ABS to a second width W2 away from the ABS. In one embodiment, the width W1 may be between around 60 nm and 200 nm, and the width W2 may be between around 120 nm and 350 nm. While the tapered region 271 is shown with a single straight surface in FIG. 2A, in alternative embodiment, the tapered region 271 may include a plurality of tapered surface with different taper angles with respect to the ABS.

The tapering improves magnetic performance. For example, reducing the width W1 at the ABS may concentrate a magnetic field generated by the write pole 220 over desirable portions of the magnetic disk 202. In other words, reducing the width W1 of the write pole 220 at the ABS reduces the probability that tracks adjacent to a desirable track are erroneously altered during writing operations.

While a small width of the write pole 220 is desired at the ABS, it may be desirable to have a greater width of the write pole 220 in areas away from the ABS. A larger width W2 of the write pole 220 away from the ABS may desirably increase the magnetic flux to the write pole 220, by providing a greater thickness of the write pole 220 in a direction generally parallel to the ABS. In operation, write current passes through coil 218 and induces a magnetic field (shown by dashed line 228) from the write pole 220 that passes through the RL 204 (to magnetize the region of the RL 204 beneath the write pole 220), through the flux return path provided by the PL 206, and back to an upper return pole 250. In one embodiment, the greater the magnetic flux of the write pole 220, the greater is the probability of accurately writing to desirable regions of the RL 204.

FIG. 2A further illustrates one embodiment of the upper return pole or magnetic shield 250 that is separated from write pole 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2A is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the write pole 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2A. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a greatest thickness at a second distance (greater than the first distance) from the ABS.

Figure 2B:
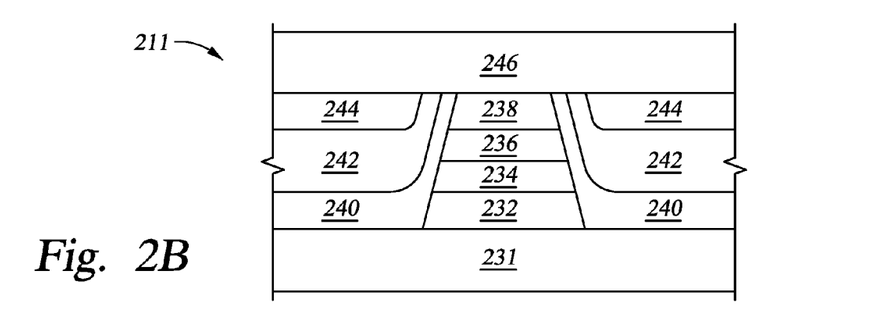
FIG. 2B is a schematic cross-sectional view of portions of the magnetic head according to one embodiment.

FIG. 2B is a schematic cross-sectional view of portions of magnetic head 211 according to one embodiment. The thickness of each layer, and the width of each layer, are for example only, and each layer may be thicker/thinner and/or wider/narrower. The magnetic head 211 includes a first shield layer 231. The first shield layer 231 may comprise a ferromagnetic material. Suitable ferromagnetic materials that may be utilized include Ni, Fe, Co, NiFe, NiFeCo, NiCo, CoFe and combinations thereof.

The magnetic head 211 also includes a sensor structure comprising a pinned magnetic layer 232, a barrier layer 234, a free layer 236 and an optional capping layer 238. The pinned magnetic layer 232 may be one of several types of pinned layers, such as a simple pinned, antiparallel pinned, self pinned or antiferromagnetic pinned sensor. For purposes of simplicity, the sensor will be described herein as an antiparallel pinned, antiferromagnetic pinned sensor having a first antiparallel layer, a second antiparallel layer, and a non-magnetic, antiferromagnetic coupling layer, such as Ru sandwiched therebetween. The first and second antiparallel layers can be constructed of several magnetic materials such as, for example NiFe or CoFe, and have magnetic moments that are pinned by exchange coupling of the first antiparallel layer with a layer of antiferromagnetic layer. The antiferromagnetic layer may include materials such as PtMn, iridium, or rhodium. The barrier layer 234 may comprise an insulating material such as MgO or alumina. The free layer 236 may comprise ferromagnetic material such as Co, CoFe, CoFeB, NiFe or combinations thereof. The capping layer 238 may comprise a material to protect the sensor from damage such as ruthenium or tantalum.

Following the formation of the sensor structure, an insulating layer 240 may be deposited on the first shield layer 231 as well as the sidewalls of the sensor structure. The insulating layer 240 may comprise an insulating material such as aluminum oxide. The insulating layer 240 may be deposited by well known deposition methods such as atomic layer deposition (ALD), chemical vapor deposition (CVD), sputtering, etc. After the insulating layer 240 is deposited, a hard bias layer 242 is then deposited. The hard bias layer 242 may comprise a material having a high magnetic moment such as CoFe.

Once the hard bias layer 242 is deposited, a hard bias capping structure 244 may be formed. In one embodiment, the hard bias capping structure 244 may comprise a multiple layer structure comprising a first tantalum layer, an iridium layer, and a second tantalum layer.

The fabrication process may proceed according to several embodiments. In one embodiment, the sensor structure is formed over the first shield layer 231. The insulating layer 240 and hard bias layer 242 are then formed. The hard bias capping structure 244 may be deposited by a sputtering method. In one embodiment, a second shield layer 246 is deposited. The second shield layer 246 may comprise a ferromagnetic material. Suitable ferromagnetic materials that may be utilized include Ni, Fe, Co, NiFe, NiFeCo, NiCo, CoFe and combinations thereof.

Figure 3A:
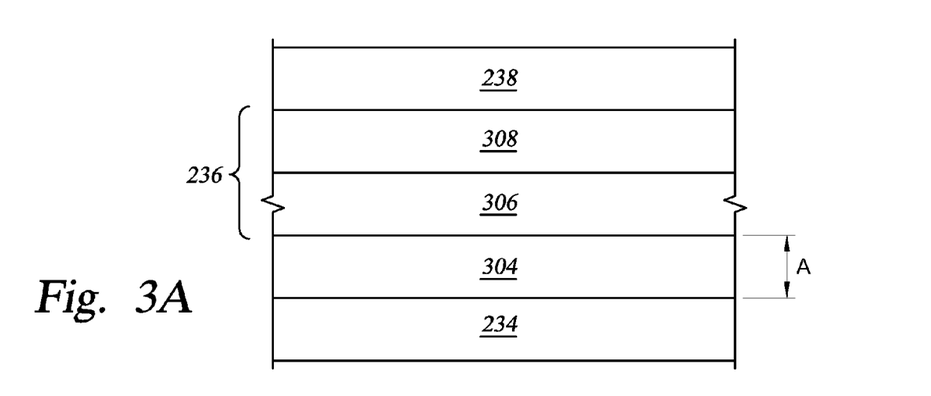
FIG. 3A is a schematic cross-sectional view of portions of the sensor structure of the magnetic head.

FIG. 3A is a schematic cross-sectional view of portions of the sensor structure of the magnetic head according to one embodiment. The barrier layer 234 may have a crystalline structure. In one embodiment, the barrier layer 234 may comprise a metal oxide, such as MgO, having a BCC crystalline structure with [100] texture. Any method may be used to form the barrier layer 234 as known in the art, such as physical vapor deposition (PVD or sputtering). In one embodiment, an MgO barrier layer is formed using sputtering in a deposition chamber. In one embodiment, the barrier layer comprises a lower barrier and an upper barrier. In one embodiment, the lower barrier may comprise MgO and be formed by a DC magnetron sputter deposition from an Mg target in an oxygen environment. In another embodiment, the upper barrier layer may comprise MgO and be formed by RF sputtering in an argon gas of $1.2 \times 10^{-4}$ ton from an MgO target onto the lower MgO barrier. It is to be understood that other materials and other deposition methods may be utilized to form the barrier layer 234.

The free layer 236 may comprise one or more magnetic layers. In one embodiment, the free layer 236 comprises two magnetic layers. In one embodiment, a first magnetic layer 306 of the free layer 236 may comprise CoFe and may be amorphous-like when formed. In one embodiment, a second magnetic layer 308 of the free layer 236 may comprise CoFeB and may be amorphous when formed. In some approaches, the free layer 236 may comprise a single layer. The free layer 236, in either embodiment (e.g., as single or multiple layers) may be a high spin polarization amorphous magnetic material. Any method may be used to form the free layer 236 as known in the art, such as PVD. It is to be understood that the magnetic layers of the free layer 236 are not restricted to CoFe or CoFeB, but, rather, other magnetic materials may be utilized.

When forming the magnetic layers 306, 308 by PVD, the first magnetic layer 306 and the second magnetic layer 308 may be formed in the same PVD chamber or in different PVD chambers. In one embodiment, the first magnetic layer comprises CoFe and the second magnetic layer comprises CoFeB and both layers are formed in a PVD chamber. It is contemplated that the PVD chamber used to deposit the free layer 236 may be the same chamber as is used to form the barrier layer 234. In one embodiment, the PVD chamber for forming the free layer 236 may be a different PVD chamber than used for forming the barrier layer 234. The multiple chambers may be within a common cluster tool such that the substrate does not leave a vacuum environment between PVD chambers or, alternatively, the multiple chambers may operate independently of a cluster tool.

The capping layer 238 is also shown, but not necessary in some approaches. Any method may be used to form the capping layer 238 as known in the art, such as PVD.

After and/or during depositing the free layer 236 or the capping layer 238, crystallization at heterogeneous interface between the free layer 236 and the barrier layer 234 may occur. An intermixing layer 304 is a mixture of the first magnetic layer 306 (or simply the free layer 236 in a single layer free layer embodiment) and the barrier layer 234 due to the fact that the first magnetic layer 306 is amorphous-like and the barrier layer 234 does not have a rigid crystalline structure.

Figure 3B:
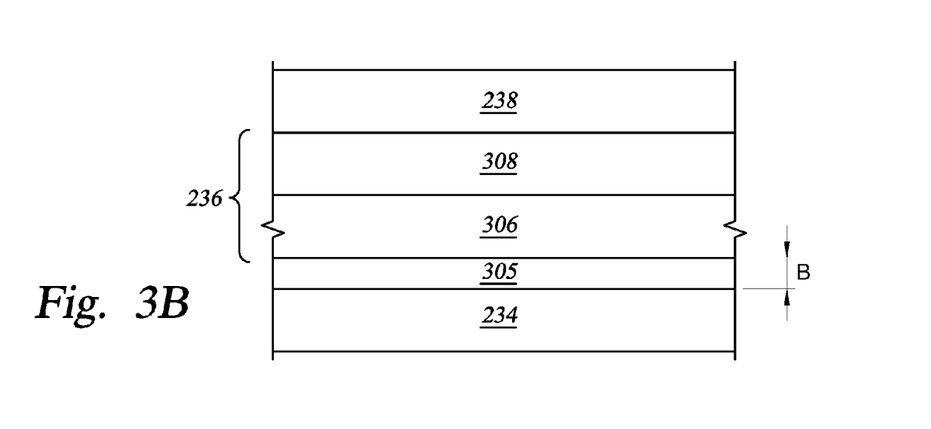
FIG. 3B is a schematic cross-sectional view of portions of the sensor structure of the magnetic head according to one embodiment of the invention.

The thickness of the intermixing layer 304 is shown by arrows "A". The intermixing can be minimized by cryogenically cooling the barrier layer 234 prior to depositing the first magnetic layer 306. When the barrier layer 234 is exposed to temperature below 0 degrees Celsius, the rigidity of the barrier layer 234 is improved, resulting in a less intermixing when the subsequent amorphous magnetic layer such as CoFe is deposited on top of the barrier layer 234. Due to the cooling the barrier layer 234, as shown in FIG. 3B, the thickness of the intermixing layer 305 is significantly reduced by 1-3 Angstroms as shown by arrows "B". A thinner intermixing layer 305 can improve the local epitaxial crystallization of the first magnetic layer 306 from the barrier layer 234/the first magnetic layer 306 interface during post annealing, resulting in a significant improvement in tunnel magnetoresistance (TMR).

Various methods can be used to cool the barrier layer 234. In one embodiment, the cooling of the barrier layer 234 may be performed in a cryogenic chamber having a stage temperature set at between −100 degrees Celsius to −300 degrees Celsius. In another embodiment, the cryogenic chamber has a stage temperature set at −200 degrees Celsius. A substrate, having the barrier layer 234 thereon may be placed in the cryogenic chamber for a predetermined time. In one embodiment, the barrier layer 234 is placed in the cryogenic chamber for between 5 to 20 minutes. In another embodiment, the barrier layer 234 is placed in the cryogenic chamber for around 10 minutes. Due to the exposure of the barrier layer 234 to the cryogenic atmosphere, the temperature of the barrier layer 234 may be reduced to below 0 degrees Celsius. In one embodiment, the barrier layer 234 is cooled to a temperature between 0 degrees Celsius to −100 degrees Celsius.

Figure 4A:
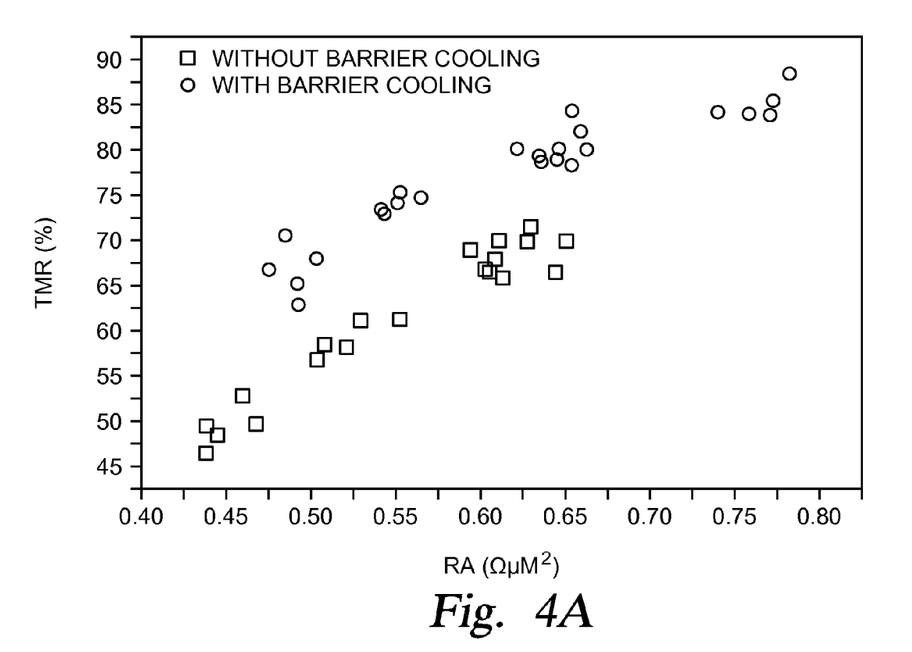
FIG. 4A is a chart showing desired effects of using a magnetic head formed through the processes described therein, according to various embodiments.

FIG. 4A is a chart describing desired effects of using a magnetic head formed through the processes described therein, according to various embodiments. In FIG. 4A, resistance times area (RA) is shown along with a TMR percentage to demonstrate the effect of cooling the barrier layer. The better the TMR percentage, the better the performance of the magnetic head will be in use. As can be seen from this chart, cooling the barrier layer prior to depositing the magnetic layers will increase the TMR.

Figure 4B:
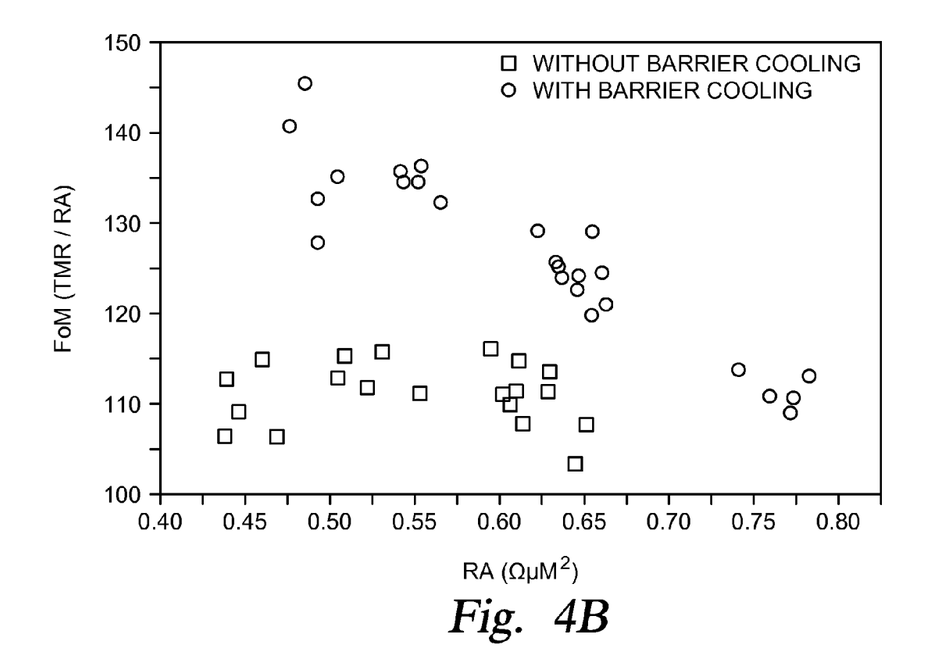
FIG. 4B is another chart showing desired effects of using a magnetic head formed through the processes described therein, according to various embodiments.

FIG. 4B is another chart describing desired effects of using a magnetic head formed through the processes described therein, according to various embodiments. In FIG. 4B, RA is shown with corresponding Figure of Merit (FoM). Higher FoM will also lead to better magnetic head performance. This chart further indicates that cooling the barrier layer will result in higher FoM, thus improving the magnetic head performance.

Figure 5:
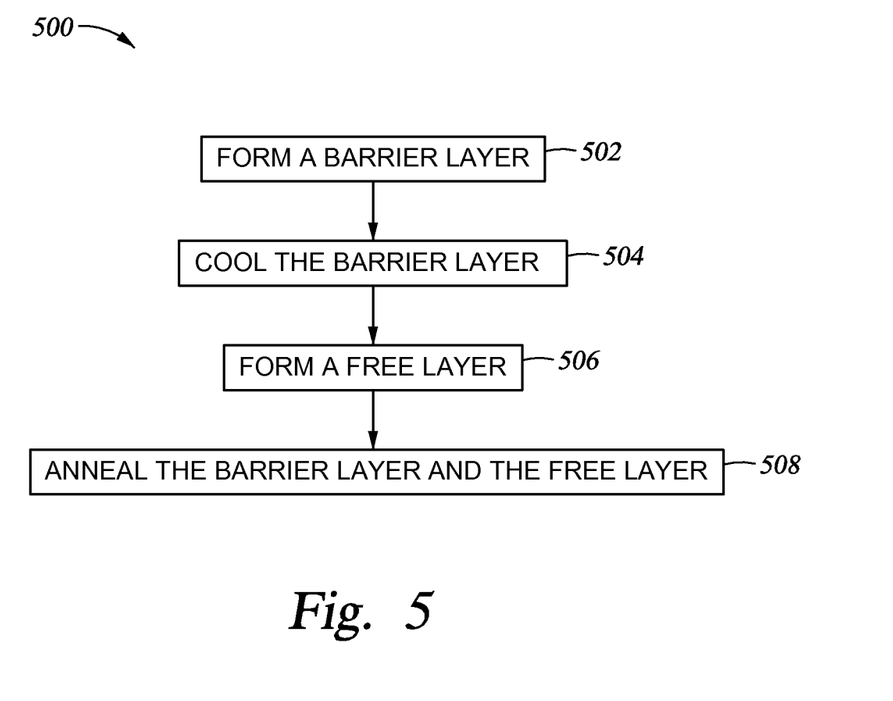
FIG. 5 is a flow diagram depicting a process for forming a magnetic head according to one embodiment.

FIG. 5 is a flow diagram depicting a process for forming a magnetic head according to one embodiment. The method 500 may be performed in any desired environment and may include more or less steps than those described below. Moreover, while certain dimensions and materials are presented, this is done by way of example only.

In operation 502, a barrier layer is formed over a substrate. The barrier layer, according to one embodiment, may have a crystalline structure. In one embodiment, the barrier layer may comprise a metal oxide, such as MgO, having a BCC crystalline structure with [100] texture. Any method may be used to form the barrier layer as known in the art, such as sputtering.

According to one embodiment, the barrier layer may be deposited on a substrate using an MgO target by sputtering. The substrate may be a wafer or a glass substrate. In some embodiments, the barrier layer may be deposited on layers that have already been deposited on the substrate. The layers already deposited on the substrate layer may be a seed layer, an antiferromagnetic layer, a synthetic antiferromagnetic layer or combinations thereof.

In operation 504, the barrier layer is cooled. The cooling may be done in any environment where the temperature is below 0 degrees Celsius. In one embodiment, the cooling is done in an atmosphere having a temperature of below −200 degrees Celsius. The cooling may be done in the same chamber in which the barrier layer is deposited onto the substrate, or in a different chamber. According to one embodiment, the substrate with the barrier layer is moved to a cryogenic chamber for cooling within the same cluster tool, thereby maintaining the vacuum condition from the deposition of the barrier layer through the cryogenic cooling of the barrier layer. The barrier layer may be cooled in a chamber that is not part of the cluster tool if desired, thereby breaking the vacuum condition.

The barrier layer may be cooled to a temperature between 0 degrees Celsius to −100 degrees Celsius. Under cooling will not result in an improvement in TMR and over cooling will negatively affect other properties of the barrier layer, e.g., more brittle. The cooling may be achieved by place the substrate with the barrier layer in a chamber for cooling for a predetermined time. In one embodiment, the barrier layer is cooled for about 10 minutes.

In operation 506, a free layer is formed on top of the barrier layer. The free layer may comprise one or more magnetic layers. In one embodiment, the free layer comprises two magnetic layers. The first magnetic layer comprises CoFe and may be amorphous-like when formed. The second magnetic layer comprises CoFeB and may be amorphous when formed. The magnetic layers may be formed through any technique known in the art, such as sputtering. Operation 506 may be performed in the same chamber as operation 502, or may be performed in a different chamber. In one embodiment, operation 506 is performed in a different chamber within the same cluster tool, such that the substrate will move from the chamber where the barrier layer is formed, to the chamber where the cryogenic processing occurs to the chamber where the free layer is formed, without breaking vacuum. In another embodiment, operation 506 is performed in a different chamber that is outside of the cluster tool, in which case, moving the substrate to the different chamber to perform operation 506 will break vacuum condition.

In operation 508, the layers of the stack, e.g., the barrier layer, the first magnetic layer and the second magnetic layer, may be annealed through any annealing process known in the art. According to some embodiments, the layers may be annealed at a temperature of from about 250 degrees Celsius to about 300 degrees Celsius for between about 3 and 7 hours. In one particular embodiment, the annealing temperature may be about 280 degrees Celsius and the annealing may take place for about 5 hours. The temperature and the annealing time may be selected based on thicknesses of the layers, layer composition, etc.

In summary, by cooling the barrier layer to a temperature below 0 degrees Celsius after the deposition of the barrier layer, less intermixing is achieved when the subsequent amorphous magnetic layers are deposited on the barrier layer. Less intermixing leads to a thinner intermixing layer, thereby improving the further epitaxial growth in the magnetic layers during annealing, resulting in an improvement in TMR.

While the foregoing is directed to embodiments of the present invention, other and further embodiments of the invention may be devised without departing from the basic scope thereof, and the scope thereof is determined by the claims that follow.

What is claimed is:

1. A method for forming a magnetic head, comprising:
   depositing a barrier layer;
   cooling the barrier layer in an atmosphere having a temperature of below 0 degrees Celsius;
   forming a free layer; and
   annealing the magnetic head.

2. The method of claim 1, wherein the barrier layer comprises MgO.

3. The method of claim 2, wherein the barrier layer has a [100] texture.

4. The method of claim 3, wherein the barrier layer has a BCC crystal structure.

5. The method of claim 1, wherein forming the free layer comprises depositing a first magnetic layer of CoFe on the barrier layer.

6. The method of claim 5, wherein forming the free layer comprises depositing a second magnetic layer of CoFeB on the first magnetic layer.

7. The method of claim 1, wherein the barrier layer is cooled to a temperature between 0 degrees Celsius to −100 degrees Celsius.

8. A method for forming a magnetic head, comprising
depositing a barrier layer on a substrate in a first chamber;
moving the substrate having the barrier layer thereon into a second chamber having a stage that is maintained at a temperature of below 0 degrees Celsius;
cooling the substrate in the second chamber for a predetermined period of time;
depositing a free layer on the barrier layer; and
annealing the magnetic head.

9. The method of claim 8, wherein the barrier layer comprises MgO.

10. The method of claim 9, wherein the barrier layer has a [100] texture.

11. The method of claim 10, wherein the barrier layer has a BCC crystal structure.

12. The method of claim 8, wherein forming the free layer comprises depositing a first magnetic layer of CoFe on the barrier layer.

13. The method of claim 12, wherein forming the free layer comprises depositing a second magnetic layer of CoFeB on the first magnetic layer.

14. The method of claim 8, wherein moving the substrate from the first chamber to the second chamber while maintaining vacuum conditions.

15. The method of claim 8, wherein the substrate having the barrier layer thereon remains in the second chamber for about 10 minutes.

16. The method of claim 8, wherein the substrate is moved to a third chamber after processing in the second chamber.

17. The method of claim 16, wherein moving the substrate to the third chamber after processing in the second chamber does not break vacuum condition.

18. The method of claim 8, wherein the substrate is moved to the first chamber after processing in the second chamber.

19. The method of claim 18, wherein moving the substrate to the first chamber after processing in the second chamber does not break vacuum condition.

* * * * *

UNITED STATES PATENT AND TRADEMARK OFFICE
CERTIFICATE OF CORRECTION

PATENT NO. : 8,619,394 B1
APPLICATION NO. : 13/689573
DATED : December 31, 2013
INVENTOR(S) : Park et al.

It is certified that error appears in the above-identified patent and that said Letters Patent is hereby corrected as shown below:

In the Specification

In Detailed Description:

Column 6, Line 10, delete "ton" and insert --torr-- therefor.

Signed and Sealed this
Twenty-ninth Day of April, 2014

Michelle K. Lee
*Deputy Director of the United States Patent and Trademark Office*